INVENTOR
THEO HILLERS

United States Patent Office 3,647,607
Patented Mar. 7, 1972

3,647,607
HIGH FREQUENCY WELDING OF POLYVINYL CHLORIDE FOAMS TO PERFORATED MATERIALS
Theo Hillers, Troisdorf, Germany, assignor to Dynamit Nobel AG, Troisdorf, Germany
Filed June 5, 1970, Ser. No. 43,724
Claims priority, application Germany, June 6, 1969, P 19 28 662.5
Int. Cl. B32b 3/30, 5/18, 31/06
U.S. Cl. 161—89      13 Claims

ABSTRACT OF THE DISCLOSURE

The high frequency welding of polyvinyl chloride foams to sievelike perforated materials, such as tricot, nettle cloth, perforated films and the like, is conducted in order to obtain a high welding seam strength by providing the side of the insulating layer facing the material to be welded with numerous, relatively small projections and/or depressions. The PVC foam, heated and plasticized by the high frequency current, penetrates through the fabric to between the projections or into the depressions and thus becomes mechanically anchored in the fabric after cooling.

---

This invention relates to a process for the high frequency welding of polyvinyl chloride (PVC) foam to sievelike perforated materials. More particularly, it relates to a process for the high frequency welding of PVC foam to sievelike perforated materials, such as tricot, nettle cloth, perforated films and foils and the like.

In the prior art, the high frequency welding of polyvinyl chloride foams to sievelike perforated materials has been conducted in a manner whereby at least the electrode disposed on the side of the sievelike perforated material is provided with an insulating layer serving essentially the functions of (a) preventing breakdowns and/or fringe breakdowns by surface conduction, (b) providing thermal insulation, (c) providing heating for the material to be welded, additional heating or secondary heating, and (d) preventing the welding material from adhering to the electrode. In accordance with the functions to be fulfilled by the insulating material, it must meet high requirements with respect to the breakdown resistance, temperature stability, dielectric strength and mechanical characteristics. In practice, the following materials, among others, are presently employed: phenolic resin-cellulose-laminated paper, silicone glass cloths, rubber cloth compounds, films of various rubber types, polytetrafluoroethylene glass fabrics, polyterephthalates and cellulose acetates, oiled linen (oil cloth) and varnished linen, silicone films, polyethylene and polypropylene films, oil-impregnated papers and glassine, epoxy resins and other thermosetting synthetic plastics, glass compounds, asbestos compounds, mica compounds and spreadable insulating films. All of these insulating materials exhibit a smooth, or relatively smooth, surface.

However, the use of insulating layers of the above-mentioned insulating substances, having a smooth or relatively smooth surface, does not give rise to a satisfactory welding seam strength in connection with high frequency weldings of PVC foam with a cloth of tricot, nettle or the like.

In order to improve the weld seam strength, a screen cloth has been used in many cases as the fabric, the screen cloth being coated on both sides with soft polyvinyl chloride. During welding, the PVC coating then bonds with the PVC foam. Not considering the high costs involved, this method exhibits, above all, the disadvantage that the cloth is very stiff and rigid, a factor which is undesirable in most cases.

One of the objects of the present invention is to provide articles of polyvinyl chloride foams welded to sievelike perforated materials.

Another object of the invention is to provide a process for the high frequency welding of PVC foams to sievelike perforated materials which overcomes the disadvantages and deficiencies of the prior art.

A further object of the invention is to provide PVC foams which are welded to perforated materials and which have a high strength at the welding seam.

A still further object of the invention is to provide the described advantages in a relatively efficacious and simple manner.

These and other objects and advantages of the present invention will become apparent to those skilled in the art from a consideration of the following specification and claims, taken in conjunction with the accompanying drawing wherein:

Figure 1:
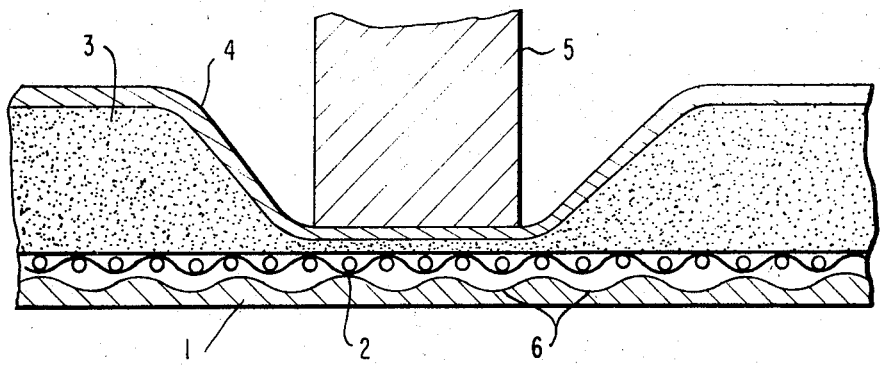
FIG. 1 shows a welding arrangement with an insulating layer having an undulated surface.

The present invention obviates the disadvantages of the prior art and is directed along a different path. In accordance therewith, it has been found that if the side of the insulating layer facing the material to be welded is provided with numerous, relatively small projections (peaks) and/or depressions (indentations), so that the PVC foam which has been heated and plasticized by the high frequency current can penetrate through the fabric to between the projections or into the depressions, a strong mechanical anchoring of the PVC foam in the fabric is obtained after cooling. Operating in this manner, it is now readily possible to employ the above-mentioned, smooth insulating materials with high success and to obtain a firm and permanent bond even when the fabric is made of a material which cannot normally be joined to the polyvinyl chloride foam by means of high frequency welding. Experiments have been shown that the weld seam strengths obtained in accordance with the present invention are approximately three times as high as those obtained by following the conventional procedures.

The present invention is especially suitable for manufacturing, for example, automobile seats, upholstered furniture and mattresses. The invention will now be explained in more detail with reference to the embodiments illustrated in the attached drawing.

On the side facing the welding material 2, 3 and 4, the insulating layer 1 is fashioned in an undulated or corrugated manner, so that the bottom fabric 2 contacts the insulating layer only in spots, but otherwise forms the hollow spaces 6 between the bottom fabric 2 and the insulating layer 1. The PVC foam 3, covered by a cover layer 4 of a fabric, leather, artificial leather, film, foil or the like, is heated up in the zone of the electrode 5 and thus penetrates, in the plastic or softened condition, through the bottom fabric 2 into the depressions or hollow spaces 6, whereby a satisfactory mechanical anchoring effect is established, after the PVC foam has cooled off, between the PVC foam and the bottom fabric 2. Simultaneously, the PVC foam is also bonded to the cover layer 4, in the zone described above.

Figure 2:
FIG. 2 shows an insulating layer fashioned as a coarse screen cloth.
Figure 3:
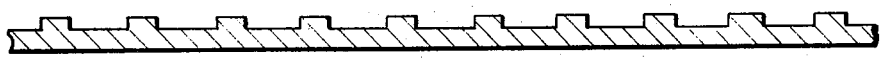
FIG. 3 shows an insulating layer of hard paper (laminated paper).

The grid-like insulating layer shown in FIG. 2 as well as the hard paper insulating layer having grooves on the side facing the welding material, shown in FIG. 3, have the characteristics that the bottom fabric is only in pointwise contact therewith and, hence, the PVC foam heated in the zone of the electrode and plasticized thereby can penetrate through the bottom fabric into the hollow spaces formed therebehind, resulting in a good mechanical bond between the bottom fabric and the polyvinyl chloride after the PVC foam has cooled.

Although the above description is specifically directed to polyvinyl chloride foams, it is to be understood that the invention is equally applicable to all synthetic resins which can be welded together in a high-frequency field, but which do not enter into a homogeneous bond with the fabric to be welded. Thus, in addition to PVC, it is also possible to use copolymers of vinyl chloride, such as copolymers of vinyl chloride and vinyl acetate, as well as susbstitutes for PVC which are similar in properties thereto, such as, for example, polyvinyl acetate. It is also possible to use, for example, polyamides in the process of the invention.

The invention being thus described, it will be obvious that the same may be varied in many ways. Such variations are not to be regarded as a departure from the spirit and scope of the invention, and all such modifications as would be obvious to one skilled in the art are intended to be included herein.

It is claimed:

1. A composite article comprising a synthetic resin foam, an insulating substrate and a sieve-like perforated material disposed therebetween, said insulating substrate being provided on the side facing the perforated material with a plurality of undulations, whereby the synthetic resin foam extends through the sieve-like perforated material in and around said undulations and is thereby mechanically anchored to said perforated material.

2. A composite article in accordance with claim 1, wherein said sieve-like perforated materials is a textile.

3. A composite article in accordance with claim 1, wherein said undulations comprise numerous, relatively small projections and depressions.

4. A composite article comprising a polyvinyl chloride foam, an insulating layer and a sieve-like perforated material disposed therebetween, said insulating layer being provided on the side facing the perforated material with a plurality of undulations, whereby the polyvinyl chloride foam extends through the sieve-like perforated material in and around said undulations and is thereby mechanically anchored to said perforated material.

5. A composite article in accordance with claim 4, wherein said polyvinyl chloride foam is additionally provided with a cover layer disposed on the side away from said sieve-like perforated material.

6. A composite article in accordance with claim 4, wherein said sieve-like perforated material is a textile material.

7. A composite article in accordance with claim 4, wherein said sieve-like perforated material is selected from the group consisting of tricot, nettle cloth and perforated synthetic resin films.

8. A composite article in acordance with claim 4, wherein said undulations comprise numerous, relatively small projections and depressions.

9. A composite article in accordance with claim 4, wherein said insulating layer is a coarse screen cloth.

10. A composite article in accordance with claim 4, wherein said insulating layer is a laminated paper material.

11. A process for the preparation of a composite article comprising a polyvinyl chloride foam, an insulating layer and a sieve-like perforated material disposed therebetween, said insulating layer being provided on the side facing the perforated material with a plurality of undulations, which comprises subjecting said article to high frequencies, whereby the polyvinyl chloride foam heated and softened by the high frequency current penetrates through the sieve-like perforated material in between and around said undulations, and then cooling the article, resulting in a strong mechanical anchoring of said polyvinyl chloride foam to said perforated material.

12. A process in accordance with claim 11, wherein said polyvinyl chloride foam is additionally provided with a cover layer disposed on the side away from said sieve-like perforated material.

13. A process in accordance with claim 11, wherein said undulations comprise numerous, relatively small projections and depressions.

References Cited

UNITED STATES PATENTS

| | | | |
|---|---|---|---|
| 2,752,279 | 6/1956 | Alderfer | 161—113 UX |
| 2,962,406 | 11/1960 | Rosa | 161—160 X |
| 3,446,685 | 5/1969 | Goldstone et al. | 161—160 X |
| 3,503,838 | 3/1970 | Marshack | 156—272 X |
| 3,510,377 | 5/1970 | Mora | 156—212 |

WILLIAM A. POWELL, Primary Examiner

U.S. Cl. X.R.

156—220, 272, 290; 161—114, 119, 122, 148, 159